(12) United States Patent
Ludlow et al.

(10) Patent No.: US 12,076,691 B2
(45) Date of Patent: Sep. 3, 2024

(54) APPARATUS AND METHOD FOR CONCENTRATING HYDROGEN ISOTOPES

(71) Applicant: Skyre Inc., East Hartford, CT (US)

(72) Inventors: Daryl Ludlow, Diamond Point, NY (US); Gregory P. Hesler, Woodstock, CT (US); Trent M. Molter, Glastonbury, CT (US)

(73) Assignee: SKYRE INC., East Hartford, CT (US)

( * ) Notice: Subject to any disclaimer, the term of this patent is extended or adjusted under 35 U.S.C. 154(b) by 0 days.

(21) Appl. No.: 18/150,911

(22) Filed: Jan. 6, 2023

(65) Prior Publication Data

US 2023/0141903 A1    May 11, 2023

Related U.S. Application Data

(60) Continuation of application No. 16/507,265, filed on Jul. 10, 2019, which is a division of application No. 15/701,089, filed on Sep. 11, 2017, now abandoned.

(60) Provisional application No. 62/385,787, filed on Sep. 9, 2016.

(51) Int. Cl.
*B01D 53/32* (2006.01)
*B01D 59/40* (2006.01)

(52) U.S. Cl.
CPC ........... *B01D 53/326* (2013.01); *B01D 59/40* (2013.01)

(58) Field of Classification Search
CPC .............................. B01D 53/326; B01D 59/40
See application file for complete search history.

(56) References Cited

U.S. PATENT DOCUMENTS

| | | | |
|---|---|---|---|
| 4,054,496 | A | 10/1977 | Arrathoon |
| 4,444,737 | A | 4/1984 | Tsuchiya |
| 5,080,693 | A | 1/1992 | Bourne et al. |
| 5,733,435 | A | 3/1998 | Prasad et al. |
| 6,332,914 | B1 | 12/2001 | Lee |
| 6,638,413 | B1 | 10/2003 | Weinberg et al. |
| 8,663,448 | B2 | 3/2014 | Eisman |
| 8,734,632 | B1 | 5/2014 | Eisman |

(Continued)

FOREIGN PATENT DOCUMENTS

| | | |
|---|---|---|
| CN | 102449840 A | 5/2021 |
| JP | S6036302 A | 2/1985 |

(Continued)

OTHER PUBLICATIONS

Adhikari et al., "Hydrogen Membrane Separation Techniques," Ind. Eng. Chem. Res. 2006, pp. 875-881, vol. 45.

(Continued)

*Primary Examiner* — Brian W Cohen
(74) *Attorney, Agent, or Firm* — CANTOR COLBURN LLP

(57) ABSTRACT

In an embodiment, a method of concentrating a hydrogen isotope, comprises delivering a fluid comprising the hydrogen isotope to be concentrated and an additional gas other than then hydrogen isotope to an anode of an electrochemical cell comprising a hydron exchange membrane comprising hydrons of the hydrogen isotope, and also comprising said anode on a first side of the hydron exchange membrane, a cathode on a second side of the hydron exchange membrane, and an electrical circuit connection between the anode and the cathode; removing a first stream in fluid communication with the cathode, the first stream comprising concentrated hydrogen isotope; and removing a second stream in fluid communication with the anode, comprising the additional gas delivered to the anode depleted of the hydrogen isotope.

18 Claims, 2 Drawing Sheets

(56) References Cited

U.S. PATENT DOCUMENTS

| | | | |
|---|---|---|---|
| 2002/0119356 A1 | 8/2002 | Shimanuki et al. | |
| 2004/0074780 A1 | 4/2004 | Twardowski | |
| 2007/0246344 A1 | 10/2007 | Bonnett et al. | |
| 2009/0029202 A1 | 1/2009 | Hossain et al. | |
| 2010/0243475 A1* | 9/2010 | Eisman | C01B 3/50 |
| | | | 204/252 |
| 2011/0044416 A1 | 2/2011 | Galindo Cabello et al. | |
| 2013/0220240 A1 | 8/2013 | Jonson et al. | |
| 2013/0327632 A1 | 12/2013 | Hayashida et al. | |
| 2015/0001092 A1 | 1/2015 | Preston | |
| 2016/0053387 A1 | 2/2016 | Kutchcoskie et al. | |
| 2016/0310898 A1 | 10/2016 | Denton et al. | |
| 2016/0368789 A1 | 12/2016 | Manabe et al. | |
| 2018/0056240 A1 | 3/2018 | Xiao et al. | |
| 2018/0071678 A1 | 3/2018 | Ludlow et al. | |
| 2018/0209051 A1 | 7/2018 | Baker et al. | |
| 2018/0257933 A1 | 9/2018 | Ludlow et al. | |
| 2019/0336911 A1 | 11/2019 | Ludlow et al. | |

FOREIGN PATENT DOCUMENTS

| | | |
|---|---|---|
| JP | S62210039 A | 9/1986 |
| JP | H04249737 A | 9/1992 |
| WO | 2016027479 A1 | 2/2016 |

OTHER PUBLICATIONS

Greenway, S. et al. "Proton exchange membrane (PEM) electrolyzer operation under anode liquid and cathode vapor feed configurations", International Journal of Hydrogen Energy, 2009, vol. 34, pp. 6603-6608.

Hibino et al., "H/D Isotope Effect on Electrochemical Pumps of Hydrogen and Water Vapor Using a Proton-Conductive Solid Electrolyte," Sep. 1, 1993, Journal of the Electrochemical Society, vol. 140 No. 9, pp. 2588-2592.

International Search Report for International Application No. PCT/US2017/050997; Date of Completion: Dec. 13, 2017; Date of Mailing: Dec. 13, 2017; 6 Pages.

Iwahara, H. "Prospect of hydrogen technology using proton-conducting ceramics", Solid State Ionics, 2004, vol. 168, pp. 299-310.

Matsumoto, H. et al. "Electromotive Force of Hydrogen Isotope Cell with a High Temperature Proton-Conducting Solid Electrolyte $CaZr0.90In0.10O32a$", Journal of The Electrochemical Society, 1999, vol. 146, Issue 4, pp. 1486-1491.

Written Opinion for International Application No. PCT/US2017/050997; Date of Completion: Dec. 13, 2017; Date of Mailing: Dec. 13, 2017; 8 Pages.

* cited by examiner

APPARATUS AND METHOD FOR CONCENTRATING HYDROGEN ISOTOPES

CROSS REFERENCE TO RELATED APPLICATION

This patent application is a continuation of U.S. application Ser. No. 16/507,265 filed on Jul. 10, 2019, which is a division of U.S. application Ser. No. 15/701,089 filed on Sep. 11, 2017, which claims priority to U.S. Provisional Patent Application Ser. No. 62/385,787, filed Sep. 9, 2016, the disclosures of which are incorporated herein by reference in their entirety.

BACKGROUND

Isotopes of hydrogen, including deuterium and tritium, are useful in a wide variety of commercial and industrial processes such as to advantageously improve the properties of a wide variety of products including food and nutrition products, agricultural products, semiconductors, fiber optics, optoelectronics, and others. While there is a strong desire to include these isotopes in numerous products and processes, such use has generally been hindered by the relative scarcity of the isotopes.

As such, there is a need for new processes and equipment to recycle these isotopes or otherwise purify fluids containing these isotopes in high purity so that they can be used or re-used in the processes in which they are employed.

BRIEF DESCRIPTION

An electrochemical hydrogen isotope concentrating apparatus is disclosed. The apparatus includes an inlet stream comprising the hydrogen isotope to be concentrated. The apparatus also includes an electrochemical cell comprising a hydron exchange membrane comprising hydrons of the hydrogen isotope, an anode on a first side of the hydron exchange membrane in fluid communication with the inlet stream, a cathode on a second side of the hydron exchange membrane, and an electrical circuit connection between the anode and the cathode. The apparatus further includes two outlet streams: a first outlet stream in fluid communication with the cathode, the first outlet stream comprising concentrated hydrogen isotope, and a second outlet stream in fluid communication with the anode, comprising fluid from the inlet stream depleted of the hydrogen isotope.

A process by which high purity hydrogen isotope products are produced is disclosed. The process comprises an electrochemical membrane process in which all conventional water containing components are pre-processed using a heavy water containing the isotope of hydrogen.

A method of concentrating an isotope of hydrogen is also disclosed. The method comprises delivering a fluid comprising the hydrogen isotope to be concentrated to an anode of an electrochemical cell comprising a hydron exchange membrane comprising hydrons of the hydrogen isotope, the anode on a first side of the hydron exchange membrane, a cathode on a second side of the hydron exchange membrane, and an electrical circuit connection between the anode and the cathode. A first stream in fluid communication with the cathode is removed, the first stream comprising concentrated hydrogen isotope. A second stream in fluid communication with the anode is removed, the second stream comprising fluid delivered to the anode depleted of the hydrogen isotope.

In some embodiments, water comprising the hydrogen isotope can be delivered to the hydron exchange membrane.

In some embodiments, the hydron exchange membrane can be contacted with water comprising the hydrogen isotope prior to delivering the fluid to be concentrated to the anode.

In any one or combination of the foregoing embodiments, water comprising the hydrogen isotope can be delivered to the hydron exchange membrane simultaneous to delivering the fluid to be concentrated to the anode.

In any one or combination of the foregoing embodiments, the hydron exchange membrane can comprise a hydrogen exchange support material and water comprising the hydrogen isotope.

In any one or combination of the foregoing embodiments, the water can comprise a predetermined atomic fraction of the hydrogen isotope.

In any one or combination of the foregoing embodiments, the predetermined atomic fraction of the isotope can be configured to produce a target hydrogen isotope purity of the first outlet stream.

In any one or combination of the foregoing embodiments, the apparatus can further comprise a source of water comprising the hydrogen isotope in fluid communication with the hydron exchange membrane.

In some embodiments, the water source can comprise a liquid water flow loop in fluid communication with the hydron exchange membrane.

In some embodiments, the water source can comprise a humidifier in fluid communication with the inlet stream.

In any one or combination of the foregoing embodiments, the hydron exchange membrane can comprise an ionomer.

In any one or combination of the foregoing embodiments, the ionomer can comprise a fluoropolymer comprising sulfonate groups.

In any one or combination of the foregoing embodiments, the apparatus can further comprise a dehumidifier in fluid communication with the first outlet stream.

In any one or combination of the foregoing embodiments, the hydrogen isotope can comprise deuterium.

In any one or combination of the foregoing embodiments, the hydrogen isotope can comprise tritium.

In any one or combination of the foregoing embodiments, the apparatus can comprise a stack of the electrochemical cells.

In any one or combination of the foregoing embodiments, the first outlet stream can be electrochemically compressed to a pressure greater than atmospheric pressure.

In any one or combination of the foregoing embodiments, water comprising the hydrogen isotope is recycled or recovered.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
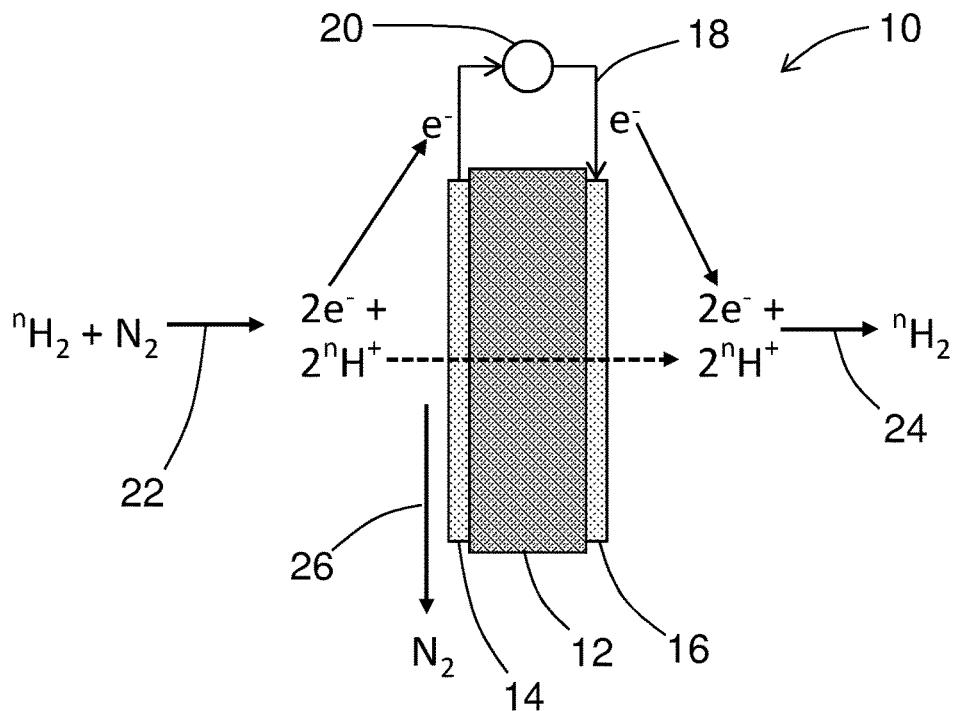
FIG. 1 is a schematic illustration of a hydrogen concentrating apparatus.

A detailed description of non-limiting example embodiments of apparatus, components, systems, and/or methods is set forth below. Corresponding reference numerals may be used throughout multiple drawings to indicate like or corresponding parts and features.

Referring now to FIG. 1, an example embodiment is shown of a hydrogen isotope concentrating apparatus 10 is shown. As shown in FIG. 1, the apparatus 10 includes an electrochemical cell comprising a hydron exchange membrane 12 with anode 14 and cathode 16 on opposite sides thereof, and an electrical circuit 18 connecting the anode and cathode. The hydron exchange membrane 12 with anode 14 and cathode 16 can also be referred to as a membrane electrode assembly or MEA. Other components can be associated with the MEA, such as anode-side and cathode-side flow field structures (not shown) that provide fluid flow paths for process liquids or gases. These structures are typically disposed distal from the MEA, with the MEA and flow field structures mounted in a frame assembly (not shown), to provide space for fluid flow in contact with the MEA. A power supply or other electronic component (e.g., an electronic control unit or ECU) with integrated power supply 20 is connected to the electrical circuit 18 to provide electrical power or control to the electrochemical cell.

In operation, the electrochemical cell receives an inlet stream 22 comprising the hydrogen isotope to be concentrated ($^nH_2$, where n is as described hereinabove). In some embodiments, the inlet stream 22 can comprise at least one other gas component (e.g., nitrogen, argon, carbon monoxide, carbon dioxide; identified in FIG. 1 as nitrogen solely for ease of reference) such as in a spent process gas recycle stream. In some embodiments, the inlet stream can be a hydrogen isotope supply stream containing impurities to be removed (i.e., increasing the concentration of the hydrogen isotope). In some embodiments, the inlet stream can contain pure hydrogen isotope or a hydrogen isotope that already meets purity specifications, and the electrochemical cell is used to provide the hydrogen isotope at a higher pressure (i.e., another form of increasing the hydrogen isotope concentration). The electrochemical cell operates as a separator in which the current from the power source 20 applied to the electrodes (anode 14 and cathode 16) drives hydrogen ions (hydrons) across the hydron exchange membrane 12 from the anode side to the cathode side while other component(s) in the inlet stream 22 remain on the anode side. Hydrogen is ionized at the anode 14, with liberated electrons acquired by the electrical circuit 18. The ionized hydrogen passes through the hydron exchange membrane 12 to the cathode side, where it combines with electrons at the cathode 16 to the hydrogen isotope to form outlet stream 24. The hydrogen-depleted gas on the anode side forms outlet stream 26, which can, depending on its identity/properties, be discharge, fully or partially recycled back to inlet stream 16, or subjected to further processing, recycling, or re-use is discharged as outlet stream 26.

Anode 14 and cathode 16 can be fabricated from catalytic materials suitable for performing the needed electrochemical reaction (e.g., the dissociation of hydrogen gas). Suitable catalytic materials include, but are not limited to, platinum, palladium, rhodium, carbon, gold, tantalum, tungsten, ruthenium, iridium, osmium, alloys thereof, and the like, as well as combinations of the foregoing materials. Anode 14 and cathode 16 are positioned adjacent to, and preferably in contact with the hydron exchange membrane 12, and can be defined by structures comprising discrete catalytic particles adsorbed onto a porous substrate. Adhesion of the catalytic particles onto a substrate may be by any method including, but not limited to, spraying, dipping, painting, imbibing, vapor depositing, or combinations of the foregoing methods, and the like. Alternately, the catalytic particles may be deposited directly onto opposing sides of proton exchange membrane 12 or onto support members (not shown).

The hydron exchange membrane can be selected from materials that can accommodate hydron exchange or transfer through the membrane while avoiding passage through the membrane of other atomic or molecular species such as nitrogen or oxygen. In some embodiments, hydron exchange materials can contain ionic molecular groups such as sulfonate groups that allow for transfer or exchange of hydrons between proximate sulfonate groups in the membrane to allow for transfer or exchange of hydrons through the membrane during operation. Examples of hydron exchange membranes can include ionomers such as sulfonated fluoropolymers (i.e., perfluoropolymers in which all hydrogens in the molecule are replaced by fluorine atoms) such as NAFION polymers sold by DuPont. Other hydron exchange materials can include materials can use different ionomers such as those with polyaromatic polymer backbone structures or partially fluorinated polymers.

As mentioned above, the hydron exchange membrane comprises hydrons of the hydrogen isotope to be concentrated. In some embodiments, the hydron exchange membrane can include such isotope(s) at an atomic concentration that is higher than the concentration of the isotope(s) found in naturally occurring hydrogen. In some embodiments, the hydron exchange membrane can include such isotope(s) at an atomic concentration that is greater than or equal to the concentration of the isotope(s) found in the inlet stream to be concentrated. In some specific example embodiments, the hydron exchange membrane can include deuterons at an atomic percentage of at least 50%, or at least 90%, or at least 99%, or at least 99.9%, or at least 99.99%, based on the total hydrogen content of the hydron exchange membrane. As used herein, the term "hydrogen isotope" means any hydrogen isotope, and the apparatus and methods disclosed herein can be used with any known isotope of hydrogen. As a practical matter, the only known stable isotopes of hydrogen are monohydrogen under normal conditions (also referred to herein as "$^1H$" or "H"), deuterium (also referred to herein as "$^2H$" or "D"), and tritium (also referred to herein as "$^3H$" or "T"), so under normal operating conditions, the hydrogen isotope to be concentrated can be monohydrogen, deuterium, or tritium. In some embodiments, the hydrogen isotope to be concentrated is deuterium. In some embodiments, the hydrogen isotope to be concentrated is tritium. Hydrogen isotopes capable of being concentrated under normal operating conditions can also be referred to collectively as "nH", where n is 1, 2, or 3, or in some embodiments n is 1 or 2, or in some embodiments n is 2, or in some embodiments n is 3.

In some embodiments, the hydrogen isotope to be concentrated can be disposed in the hydron exchange membrane by pre-treating the hydron exchange membrane or material out of which the membrane is to be formed with isotopic water. As used herein, the term "isotopic water" means water that has a higher concentration of the hydrogen isotope to be concentrated than occurring naturally in water. The pre-treatment process can occur during or after fabrication of the hydron exchange material. In some embodiments, isotopic water can be used to ionize ionic groups (e.g., reacting water with a sulfonyl fluoride to form sulfonate groups). However, the handling and processing of isotopic water in such strongly acidic reaction conditions can present difficulties. Accordingly, in some embodiments, the hydron exchange material can be contacted with isotopic water after ionization by regular water, allowing for hydrons of the hydrogen isotope to be concentrated to displace hydrons of different isotopes such as monohydrogen from the molecules of the hydron exchange material. This can be done regardless of whether the polymer is in the form of pellets or already fabricated into membrane sheets. The pre-treatment involves repeatedly soaking the hydron exchange material in isotopic water, if necessary with repeat soakings in fresh isotopic water until the isotope levels in the hydron exchange material reach the desired levels. Soaking at elevated temperature (e.g., between 25° C. and 100° C.) may be performed as well. If the hydron exchange membrane has multiple components or layers, each of the components or layers can be pre-treated as well. For example, small strands of ionomer can be extended into the electrode layer, and this material can also be treated with isotopic water.

Conventional proton exchange membranes (PEM) contain protons that are ionically bound to anionic groups such as sulfonates. The strength of these ionic bonds can be overcome under the influence of the protons being electrochemically urged from the anode to the cathode so that protons transfer between proximate ionic groups. Accordingly, as protons enter the proton exchange membrane from the anode, different protons, which had immediately prior been disposed in the membrane, emerge from the membrane to form hydrogen gas at the cathode. In the case of electrolytic concentration of hydrogen isotopes having a different distribution of isotopes than found in nature, conventional proton exchange membranes can contaminate the concentrated hydrogen isotope stream with different hydrogen isotopes from the inlet stream. The hydron exchange membranes disclosed herein, on the other hand, can contain the hydrogen isotope to be concentrated in the same isotopic proportion or even in a more concentrated isotopic proportion than found in the inlet stream. This can provide a technical effect of reducing a potential source of isotopic contamination.

In some embodiments, isotopic water can be present at the surface of, in pores or hydrated to the polymer matrix of the hydron exchange membrane during operation. Water can facilitate low resistance ionic transport as the proton transfers from one ionic site to another within the membrane. The water can solvate (hydrate) the ionic groups of the hydron exchange material and also can hydrogen bond to other sites within the polymeric chain of a given membrane. Water molecules can be characterized by an equilibrium ionization reaction: $H_2O \leftrightarrow O^+ + OH^-$. This equilibrium of the reaction is heavily weighted towards formation of $H_2O$; however, a portion of water molecules are always entering or exiting the ionized state. Free hydrons and hydroxyl groups in the ionized state can recombine with hydroxyl groups or hydrons from other water molecules. Thus, a mixture of $D_2O$ and $H_2O$ will over time form all possible molecular combinations of $H_2O$, $D_2O$, and HDO. Similarly, a mixture of $T_2O$ and $H_2O$ will form all possible molecular combinations of H2O, T2O, and HTO. A mixture of $T_2O$ and $D_2O$ will form all possible molecular combinations of $T_2O$, $D_2O$, and TDO. Also, a mixture of $H_2O$, $D_2O$, and $T_2O$ will form all possible molecular combinations of $H_2O$, $D_2O$, $T_2O$, HDO, HTO, and TDO. Gas molecules can also take part in this molecular exchange, with hydrogen molecules ionizing and re-combining with ions from water or other gases. The ionization equilibrium reaction of water is believed to play a role in ionic transport of hydrons between ionic groups in the hydron exchange membrane, so the presence of hydrogen isotopes in the water at the hydron exchange membrane different than the target isotope to be concentrated would appear as a contaminant in the hydrogen isotope output from the apparatus. Accordingly, in some embodiments, water at the hydron exchange membrane can include the isotope(s) of interest at an atomic concentration that is higher than the concentration of the isotope(s) found in naturally occurring water. In some embodiments, the water at the hydron exchange membrane can include such isotope(s) at an atomic concentration that is greater than or equal to the concentration of the isotope(s) found in the inlet stream to be concentrated. In some specific example embodiments, the water at the hydron exchange membrane can include deuterons at an atomic percentage of at least 50%, or at least 90%, or at least 99%, or at least 99.5%, or at least 99.5% or at least 99.9%, or at least 99.99%, based on the total hydrogen content of the water at the hydron exchange membrane (i.e., isotopic purity).

Figure 2:
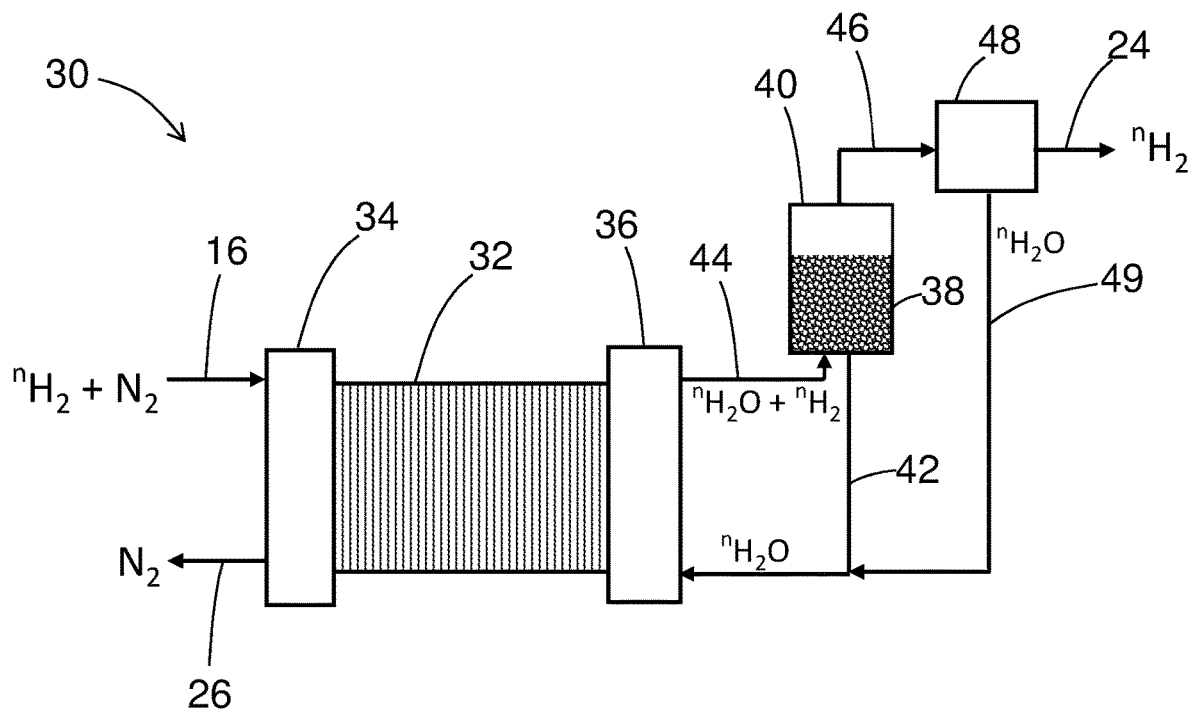
FIG. 2 is a schematic illustration of a hydrogen concentrating apparatus with liquid water comprising a hydrogen isotope supplied to a hydron exchange membrane.
Figure 3:
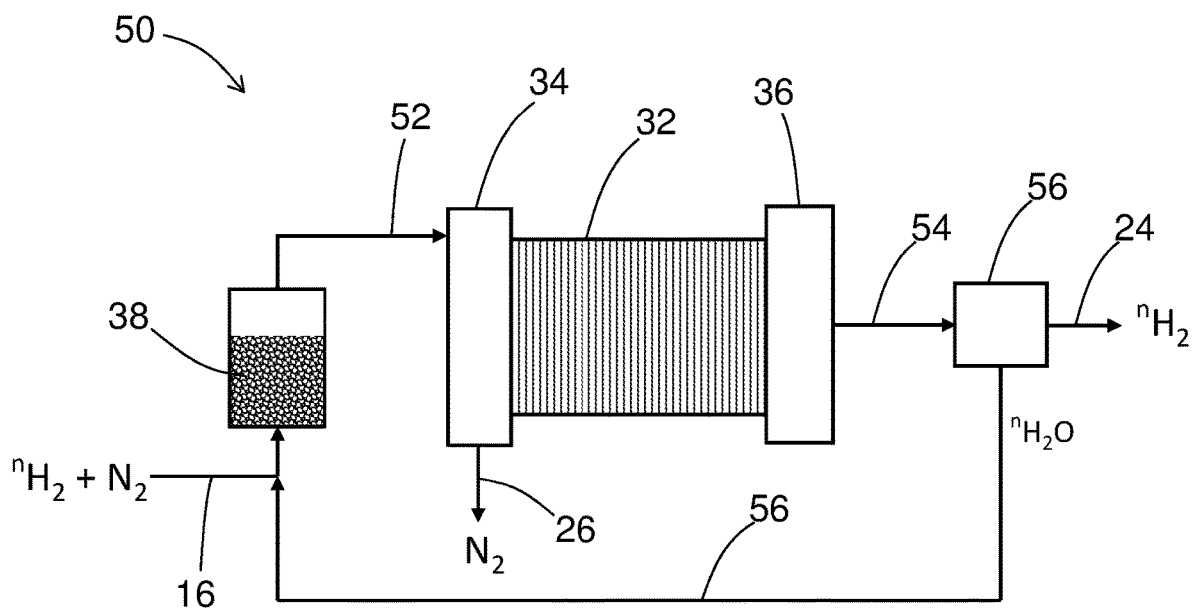
FIG. 3 is schematic illustration of a hydrogen concentrating apparatus with water vapor comprising a hydrogen isotope supplied to a hydron exchange membrane.

FIGS. 2 and 3 show schematic representations of hydrogen concentrating apparatus with provisions for delivery of water to the hydron exchange membrane. In FIG. 2, isotopic water is delivered to the cathode side of the electrochemical cell via a liquid water circulation loop, and in FIG. 3, isotopic water is delivered to the anode side of the electrochemical cell as water vapor in a humidified inlet stream. In-process delivery of water to the hydron exchange membrane can be done in combination with or as an alternative to pre-treatment of the hydron exchange membrane to incorporate hydrons of the hydrogen isotope into the hydron exchange membrane.

With reference to FIG. 2, an electrochemical cell stack 32 comprises multiple electrochemical cells (not shown) individually comprising a hydron exchange membrane with anode and cathode on opposite sides of the membrane, electrically connected in series. For ease of illustration, internal stack electrical connections and external connection of the stack to a power supply are not shown in FIGS. 2 and 3. Also, anode side supply and exhaust manifolds (shown conceptually in FIG. 2 as a single manifold 34) direct the inlet stream to the anode sides of the cells in the stack 32 and remove the outlet (anode exhaust) stream 26. On the cathode side of FIG. 2, a water vessel and pump 40 (pump not shown) pumps isotopic water 38 through line 42 to a cathode side inlet manifold component of the cathode side manifold 32. Hydrogen isotope gas produced at the stack cathodes bubbles through the isotopic water and forms outlet stream 44 containing isotopic water and the hydrogen isotope. In water a 46, which can be directed to an optional compression and/or drying stations, represented as 48 in FIG. 2 to produce a final hydrogen isotope outlet stream 24.

With reference to FIG. 3, water is delivered to the hydron exchange membrane as water vapor in the inlet feed stream. As shown in FIG. 3, the inlet stream 16 is directed to humidifier (also sometimes referred to as a saturator) 38, where it is humidified with isotopic water and delivered as humidified hydrogen isotope stream 52 to the anode manifold 34. On the cathode side, a stream of concentrated hydrogen isotope 54 can be optionally dried at drying station 56 to produce a final hydrogen isotope outlet stream 24. In some embodiments, the system of FIG. 3 without a liquid water loop can be used as an electrochemical cell compressor (i.e., electrochemical cell hydrogen pump) to provide pressurized hydrogen isotope output gas.

Any water that exits the membrane with the gas phase species of interest can optionally be removed by conventional methods such including but not limited to cold trap, adsorbents, membrane or ceramic membranes and films, palladium separators, or pressure swing absorption processes (PSA). The reclaimed water can optionally be recycled such as shown with water recycle stream 49 (FIG. 2) or water recycle line stream 56 (FIG. 3). Water recovery and recycle can also be included at numerous other places in the apparatus, such as from the outlet stream 26, inlet stream 52 (FIG. 3) where a demister could be used to remove entrained liquid from the humidifier 38. Multiple water recovery stages can also be used. For example, the hydrogen isotope gas stream 46 coming off of the water vessel 40 in FIG. 2 could be subjected first to a demister such as a coalescing filter to remove any micro-sized droplets of liquid water, followed by PSA or adsorbent processing to remove water vapor.

The apparatus can also include a controller (not shown) in communication (e.g., via a wired or wireless electronic signal) with the first and second electrochemical cell, specifically in communication with the power supply and with other process control components such as pumps, heat exchangers, pressure control valves, flow meters, temperature sensors, electrical sensors, and various other components such as control valves such as controlling flow of the feed gas 32 and other process control equipment.

Of course, as mentioned above, the system depicted in the Figures are exemplary, and systems and apparatus according to this disclosure can include various other components. For example, multiple electrochemical stacks can be disposed in parallel and/or multiple second stacks can be disposed in parallel to provide additional capacity. Multiple stacks can be disposed in series and/or multiple second stacks can be disposed in series to provide greater hydrogen isotope pressure outputs and/or purity. Other modifications and/or additions within the skill of the art can be made as well. For example, a heat exchanger or enthalpy exchanger can be included to recover heat and/or water from the anode exhaust stream 26 and transfer it to the inlet stream 16.

EXAMPLES

Tests were performed to investigate isotopic exchange within an electrochemical pump. The pump and humidifier were pre-treated with $D_2O$ and used to pump $D_2$. A mass spectrometer was used to monitor the content of the pumped gas exiting the cathode compartment. Upon switching from using a $D_2O$ pretreated humidifier to a $H_2O$ humidifier a rapid increase in H was observed. This demonstrated how readily isotopes exchange within the electrochemical device and supporting sub-systems.

While the this disclosure makes reference herein to exemplary embodiments, it will be understood by those skilled in the art that various changes may be made and equivalents may be substituted for elements thereof without departing from the scope hereof. In addition, many modifications may be made to adapt a particular situation or material to the teachings herein without departing from the essential scope thereof. Therefore, it is intended that the disclosure is not limited to the particular embodiments disclosed herein, but includes all embodiments falling within the scope of the claims.

The invention claimed is:

1. A method of concentrating a hydrogen isotope, comprising
   humidifying a gas stream comprising the hydrogen isotope to be concentrated and an additional non-hydrogen containing gas other than the hydrogen isotope, wherein humidifying the gas stream comprises flowing the gas stream through a humidifier comprising isotopic water to form a humidified hydrogen isotope stream;
   delivering the humidified hydrogen isotope stream to an anode of an electrochemical cell comprising a hydron exchange membrane comprising hydrons of the hydrogen isotope, and also comprising said anode on a first side of the hydron exchange membrane, a cathode on a second side of the hydron exchange membrane, and an electrical circuit connection between the anode and the cathode;
   removing a first stream in fluid communication with the cathode, the first stream comprising concentrated hydrogen isotope; and
   removing a second stream in fluid communication with the anode, comprising the additional non-hydrogen containing gas delivered to the anode depleted of the hydrogen isotope.

2. The method of claim 1, wherein the additional non-hydrogen containing gas comprises at least one of nitrogen, argon, carbon monoxide, or carbon dioxide.

3. The method of claim 1, wherein the additional non-hydrogen containing gas comprises nitrogen.

4. The method of claim 1, wherein the hydrogen isotope comprises at least one of deuterium or tritium.

5. The method of claim 1, further comprising delivering water comprising the hydrogen isotope to the hydron exchange membrane.

6. The method of claim 1, comprising contacting the hydron exchange membrane with water comprising the hydrogen isotope prior to delivering the fluid to be concentrated to the anode.

7. The method of claim 1, comprising delivering water comprising the hydrogen isotope to the hydron exchange membrane simultaneous to delivering the fluid to be concentrated to the anode.

8. The method of claim 1, further comprising recovering or recycling water comprising the hydrogen isotope.

9. The method of claim 1, further comprising electrochemically compressing the first stream to a pressure greater than atmospheric pressure.

10. The method of claim 1, wherein the hydron exchange membrane comprises a hydrogen exchange support material and water comprising the hydrogen isotope.

11. The method of claim 10, wherein the water comprises a predetermined atomic fraction of the hydrogen isotope.

12. The method of claim 11, wherein the predetermined atomic fraction of the isotope is configured to produce a target hydrogen isotope purity of the first outlet stream.

13. The method of claim 1, further comprising directing water from a water source comprising the hydrogen isotope to the hydron exchange membrane.

14. The method of claim 13, wherein the directing the water from the water source comprises directing the water to the first side or the second side of the hydron exchange membrane via a liquid water flow loop.

15. The method of claim 14, wherein the water source comprises a humidifier.

16. The method of claim 1, further comprising dehumidifying the first stream.

17. The method of claim 1, wherein the hydron exchange membrane comprises an ionomer.

18. The method of claim 17, wherein the ionomer comprises a fluoropolymer comprising sulfonate groups.

* * * * *